Patented Aug. 21, 1934

1,970,972

UNITED STATES PATENT OFFICE

1,970,972

NEW RUBBER PRESERVING MEDIA

Ludwig Orthner, Leverkusen - on - the - Rhine, and Max Bögemann and Theodor Weigel, Cologne-Mulheim, Germany, assignors to I. G. Farbenindustrie Aktiengesellschaft, Frankfort-on-the-Main, Germany No Drawing. Application October 21, 1930, Serial No. 490,324. In Germany October 22, 1929

7 Claims. (Cl. 18—50)

This invention relates to the preserving of rubber against deterioration due to age.

As is known unvulcanized and vulcanized rubber lose their valuable properties by prolonged exposure to light, air and heat. The German specification No. 366,114 describes a process, which renders possible the protection of rubber from the injurious influences due to ageing. For this purpose rubber is treated, before or after the vulcanization process with aromatic compounds, containing substituted or unsubstituted amino and/or hydroxy groups.

In accordance with the present invention a specific type of compounds falling within the above classification, and the use of which for preserving rubber has not been described hitherto, has been found of particular value for the preservation of rubber.

The process of the invention is by incorporating with natural rubber or synthetic rubber-like masses a substance of the general formula:—

wherein R and R' are similar or dissimilar aromatic radicals, of which at least one is substituted by one or more hydroxy groups, which groups, may be wholly or partly alkylated, and which radicals may be further substituted by other monovalent substituents, for example, by alkyl, halogen or nitro groups, and wherein $x$ and $y$ signify hydrogen or alkyl or $xy$ taken together signify an alkylene group.

The following are examples of this class of substances which operate to inhibit or retard the ageing of natural rubber and artificial rubber-like masses.

Ortho-hydroxy-diphenylmethane
Para-hydroxy-diphenylmethane
Para-ethoxy-diphenylmethane
2.4 - dibenzyl - phenetol, 4.4'-dihydroxy-diphenylmethane
2.4-dihydroxy-diphenylmethane
Alpha-benzyl-beta-naphthol
Di-(para-hydroxy-phenyl)-dimethylmethane
1.1'-di-(para-hydroxyphenyl)-cyclohexane
1.1'-di-(para-hydroxy-ortho-tolyl)-cyclohexane
4.4'-dihydroxy-diphenyl-methylmethane
3.5.3'.5'-tetrachloro-2.2'-dihydroxy-diphenyl-methane
2.2'-dihydroxy-5.5'-dichlorodiphenylmethane
3.3'-dinitro-4.4'-dihydroxy-diphenylmethane.

The addition of these compounds to rubber or artificial rubber-like masses produces excellent ageing properties, while as a rule no change in the color of the vulcanizates is involved. The vulcanization process is not influenced by the presence of the compounds in question and the vulcanizates are odorless. The incorporation with any desired rubber mixture, can be effected, for example, on the rollers, and vulcanization may then be performed according to the customary processes.

A further possible method of the application of the said protective agents consists in treating the ultimate vulcanizates with a solution of the respective protective agents. In the appended claims the words "incorporating within rubber" are intended to define the incorporation of the rubber preserving media into rubber or artificial rubber-like masses either before or after vulcanization as outlined above.

The term "artificial rubber-like masses" as used herein is intended to include all polymerization products possessing rubber like properties and at least partially consisting of a polymerization product derived from a butadiene hydrocarbon, such as butadiene-(1.3), isoprene, 2.3-dimethylbutadiene-(1.3), etc.

The following example further illustrates the invention, without limiting it thereto:—

*Example:*—A mixture of the composition:—
100.0 parts by weight of smoked sheets
9.0 parts by weight of zinc oxide.
2.8 parts by weight of sulfur
1.0 part by weight of diphenylguanidine
1.0 part by weight of stearic acid
30.0 parts by weight of lithopone and
1.2 parts by weight of protective agent ($a$, $b$, $c$, $d$, or $e$)
is vulcanized for 30 minutes at 3½ atmospheres pressure (superatmospheric).
  $a$=benzylresorcin
  $b$=para-hydroxy-diphenylmethane
  $c$=benzyl-$\beta$-naphthol
  $d$=di-(para-hydroxyphenyl)-dimethyl-methane
  $e$=1.1' - di - (ortho-hydroxyphenyl) - cyclohexane.

With the vulcanizates thus obtained the experiments set forth in the appended table were carried out in the Geer oven at 70° C. Two days of artificial ageing according to this method correspond approximately to the natural ageing in the course of one year.

*Strength in kg/sq. cm.*

|  | Without addition | Addition *a* | Addition *b* | Addition *c* | Addition *d* | Addition *e* |
|---|---|---|---|---|---|---|
| Prior to the ageing test | 243 | 235 | 249 | 243 | 228 | 237 |
| Heated for 10 days at 70° C | 63 | 183 | 191 | 196 | 184 | 181 |
| Heated for 15 days at 70° C | 41 | 142 | 165 | 168 | 147 | 139 |

When substituting for the natural rubber employed in this example a synthetically produced rubber-like mass considerably better ageing values are likewise attained by the same additions.

We claim:

1. A process for preserving rubber which comprises incorporating within the rubber a dihydroxy diphenylmethane compound, the benzene radicals of which contain either halogen atoms or nitro groups.

2. A process for preserving rubber which comprises incorporating within the rubber a compound of the general formula

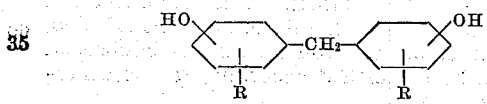

wherein R stands for a halogen atom or a nitro group.

3. A process for preserving rubber which comprises incorporating within the rubber a compound of the general formula

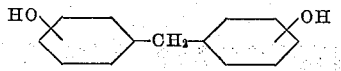

wherein the benzene nuclei contain at least one halogen atom or one nitro group.

4. The process for preserving rubber which comprises incorporating within the rubber 2.2'-dihydroxy-5.5'-dichlorodiphenylmethane.

5. A process which comprises mechanically incorporating within unvulcanized natural rubber sulfur and a dihydroxy diphenylmethane compound the benzene radicals of which contain either halogen atoms or nitro groups, and vulcanizing the mixture.

6. A process which comprises mechanically incorporating within unvulcanized natural rubber sulfur and a compound of the general formula

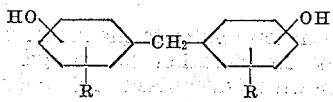

wherein R stands for a halogen atom or a nitro group, and vulcanizing the mixture.

7. A process which comprises mechanically incorporating within unvulcanized natural rubber sulfur and 2.2'-dihydroxy-5.5'-dichlorodiphenylmethane, and vulcanizing the mixture.

LUDWIG ORTHNER.
MAX BÖGEMANN.
THEODOR WEIGEL.